(12) United States Patent
Wen

(10) Patent No.: US 10,975,906 B2
(45) Date of Patent: Apr. 13, 2021

(54) CABLE ADJUSTING DEVICE FOR VEHICLE

(71) Applicant: Yuan-Hung Wen, Chang Hua County (TW)

(72) Inventor: Yuan-Hung Wen, Chang Hua County (TW)

(*) Notice: Subject to any disclaimer, the term of this patent is extended or adjusted under 35 U.S.C. 154(b) by 0 days.

(21) Appl. No.: 16/927,643

(22) Filed: Jul. 13, 2020

(65) Prior Publication Data

US 2021/0018035 A1      Jan. 21, 2021

(30) Foreign Application Priority Data

Jul. 15, 2019   (TW) .................................. 10812495

(51) Int. Cl.
*F16C 1/26*     (2006.01)
*F16C 1/22*     (2006.01)

(52) U.S. Cl.
CPC .............. *F16C 1/226* (2013.01); *F16C 1/262* (2013.01)

(58) Field of Classification Search
CPC .. F16C 1/262; F16C 1/26; F16C 1/226; F16C 1/223; F16C 1/22; F16C 1/10
See application file for complete search history.

(56) References Cited

U.S. PATENT DOCUMENTS

| | | | | |
|---|---|---|---|---|
| 3,468,185 A | * | 9/1969 | Houk ........................ | F16C 1/18 74/502.5 |
| 3,988,943 A | * | 11/1976 | Orcutt ..................... | F16C 1/226 74/502.5 |
| 5,809,840 A | * | 9/1998 | Oda ........................ | F16C 1/107 74/502.6 |
| 6,345,549 B1 | * | 2/2002 | Lance .................... | B60N 2/853 74/500.5 |
| 9,869,342 B2 | * | 1/2018 | Shipman ................... | F16C 1/16 74/502.5 |

FOREIGN PATENT DOCUMENTS

| | | | |
|---|---|---|---|
| DE | 102005063551 B4 * | 8/2018 | .......... F16C 29/0621 |
| TW | 418167 B | 1/2001 | |

OTHER PUBLICATIONS

Machine Translation of DE 10 2005 063 551, obtained Sep. 13, 2020.*

* cited by examiner

*Primary Examiner* — Richard W Ridley
*Assistant Examiner* — Brian J McGovern
(74) *Attorney, Agent, or Firm* — Muncy, Geissler, Olds & Lowe, P.C.

(57) ABSTRACT

A cable adjusting device for vehicle includes a first sleeve and a second sleeve. The first sleeve includes a first opening and a second opening. The second sleeve is screwed to the second opening. The inner wall of the second sleeve includes a first stop portion. The first stop portion includes a first through hole. The first through hole is communicated with the first opening.

8 Claims, 6 Drawing Sheets

CABLE ADJUSTING DEVICE FOR VEHICLE

BACKGROUND OF THE INVENTION

Field of the Invention

The present invention relates to a cable adjusting device for vehicle.

Description of the Prior Art

In speed shifting or braking of a bicycle, the shifting wire or the brake wire is pulled, by pressing the operating device mounted on the handle, to actuate the shifting device or the braking device. The wire is generally covered by an outer tube of the wire. TW418167 discloses a like device.

However, the above-mentioned device has a complicated structure. A plurality of parts are manufactured and then assembled, which has high cost, complicated process for mounting to the bicycle.

The present invention is, therefore, arisen to obviate or at least mitigate the above-mentioned disadvantages.

SUMMARY OF THE INVENTION

The main object of the present invention is to provide a cable adjusting device for vehicle which has light weight, low cost, good structural strength, long service life, low frictional resistance and easy adjustment.

To achieve the above and other objects, the present invention provides a cable adjusting device for vehicle, including: a first sleeve, including a first opening and a second opening; a second sleeve, screwed to the second opening, an inner wall of the second sleeve including a first stop portion, the first stop portion including a first through hole, the first through hole is communicated with the first opening.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
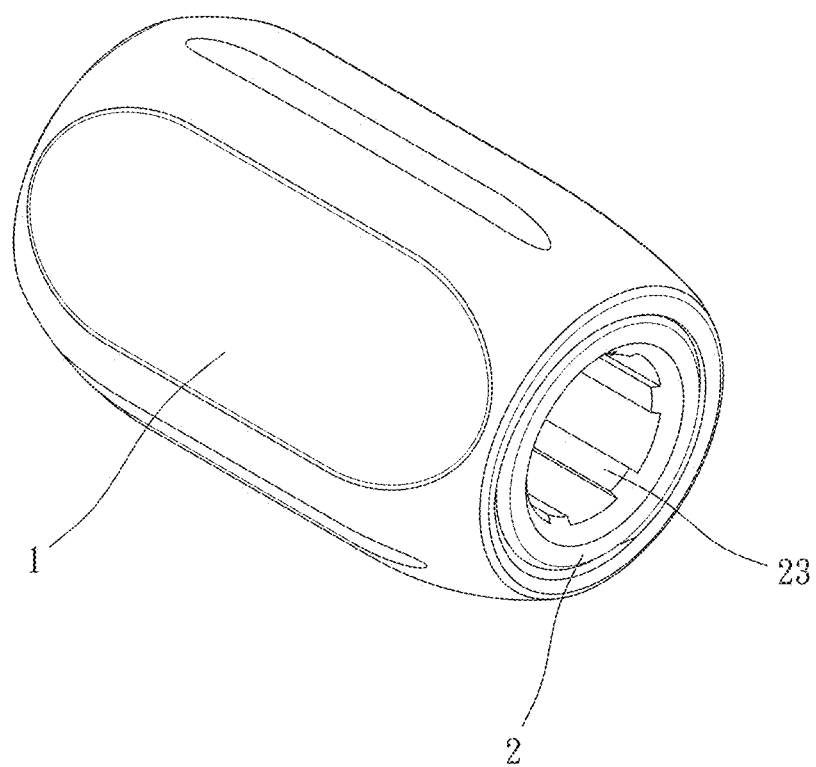
FIG. 1 is a stereogram of a preferable embodiment of the present invention.
Figure 2:
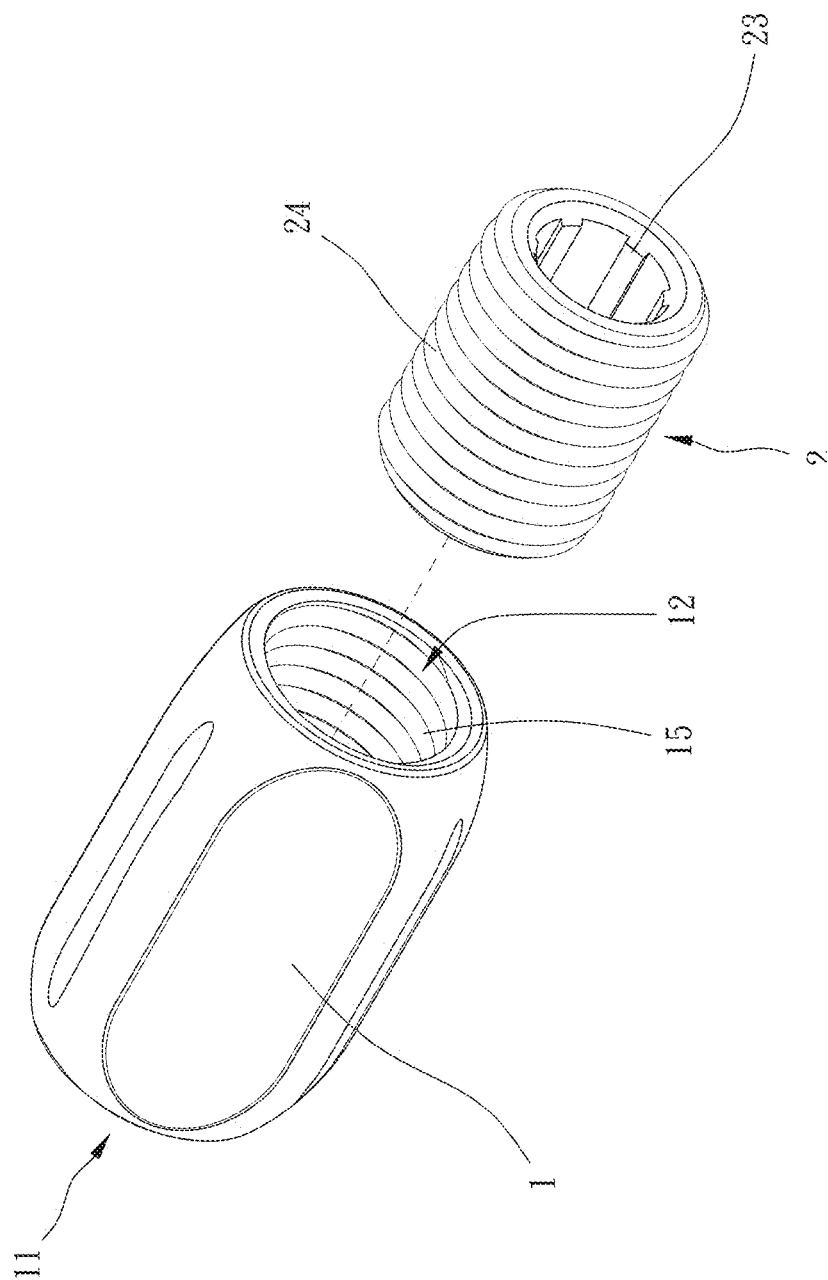
FIGS. 2 to 4 are breakdown drawings of a preferable embodiment of the present invention.
Figure 3:
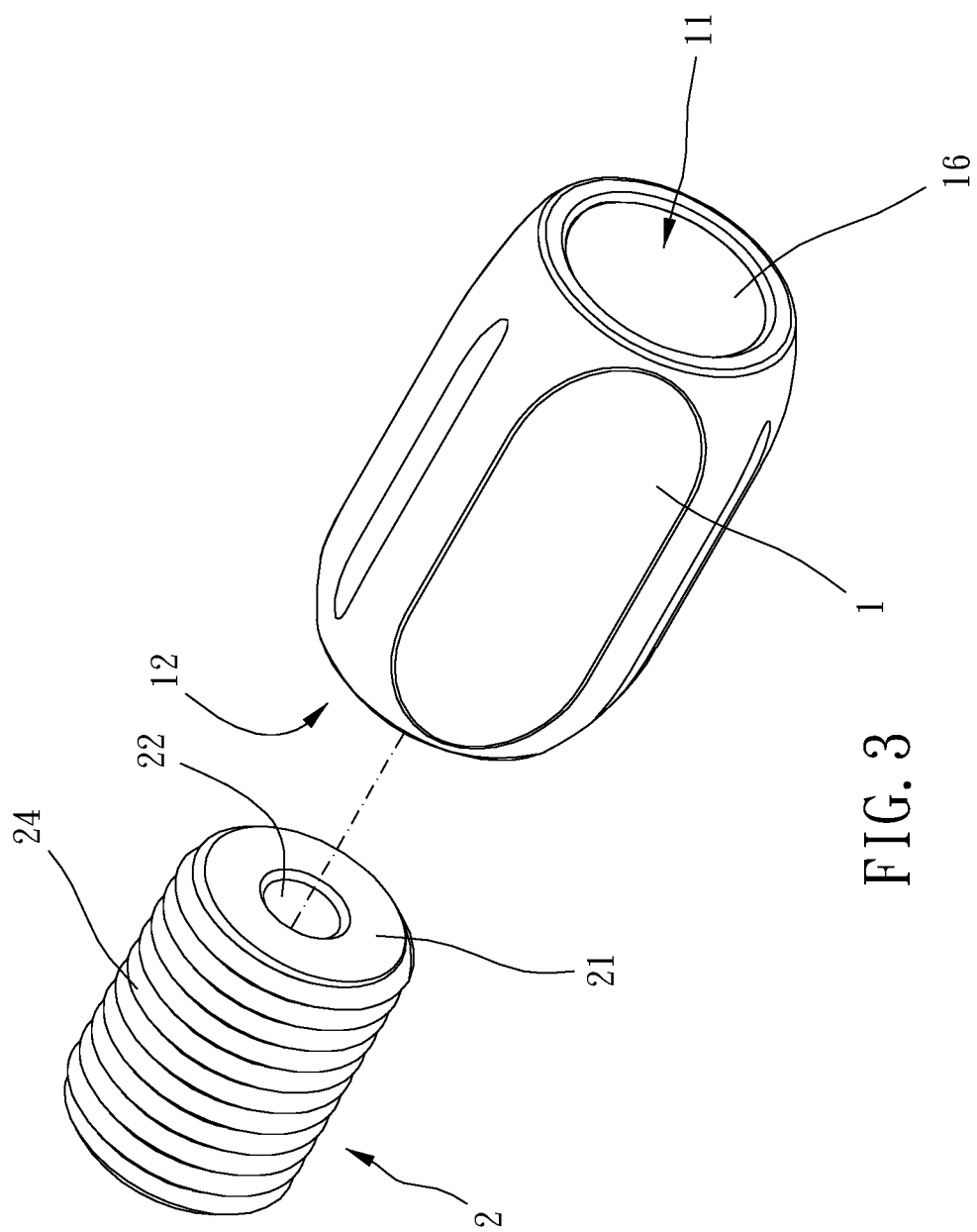
Figure 4:
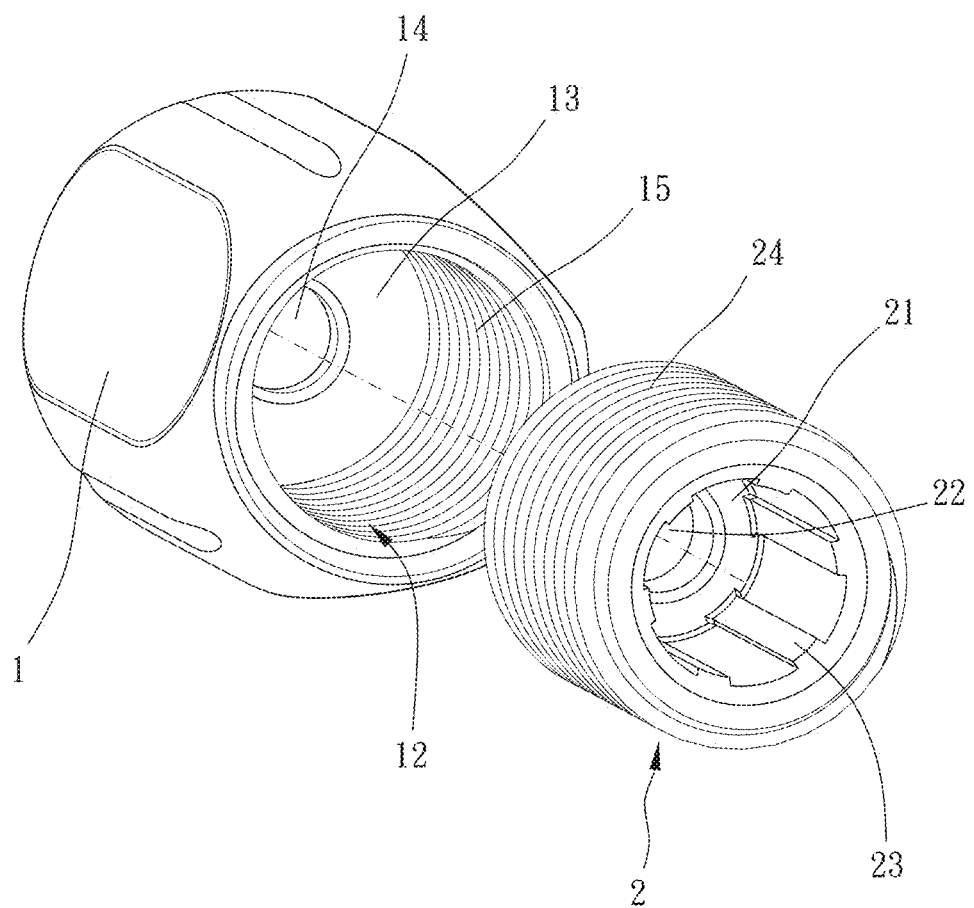
Figure 5:
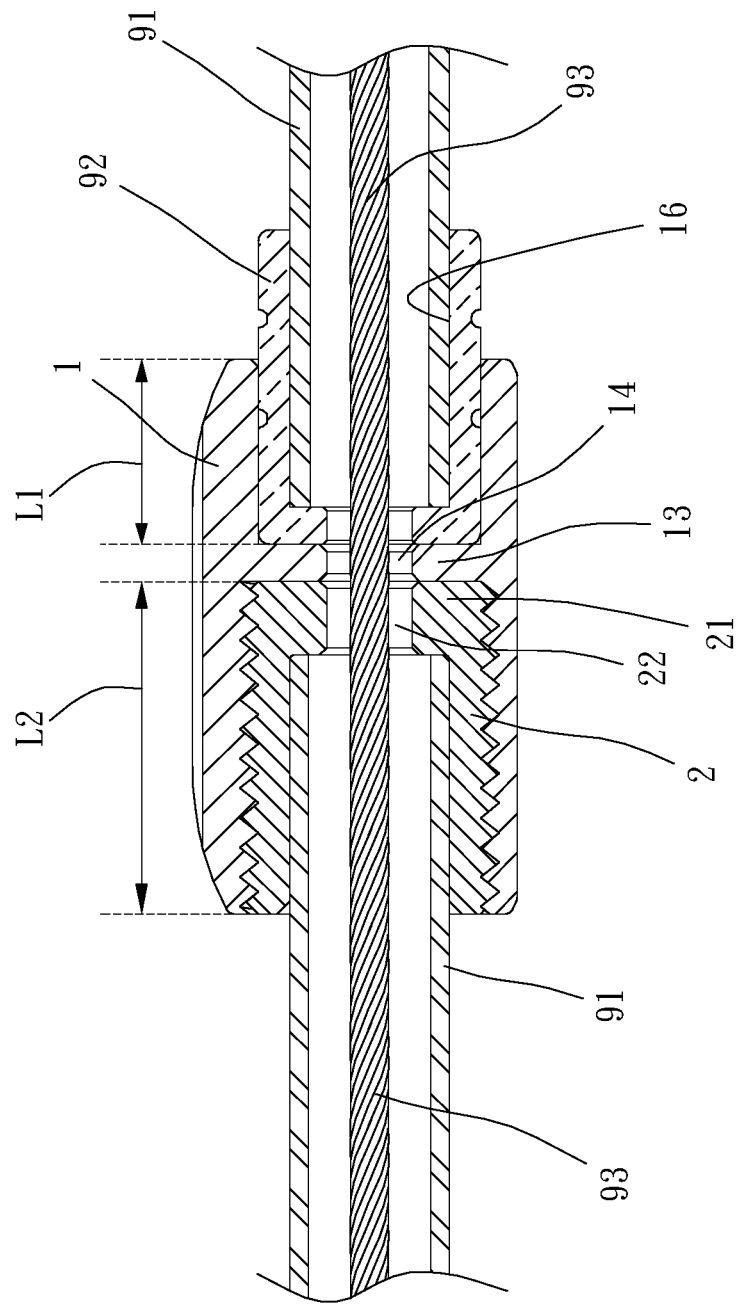
FIGS. 5 and 6 are drawings showing operation of a preferable embodiment of the present invention.
Figure 6:
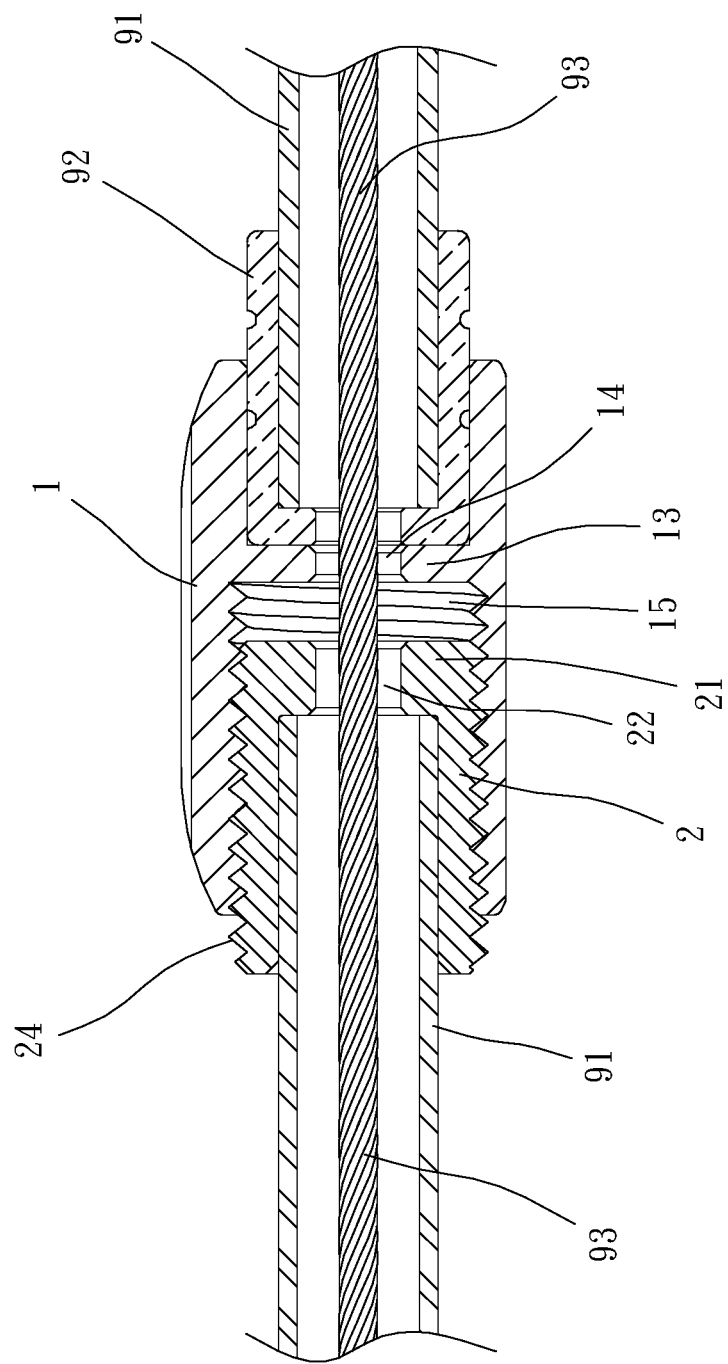

Please refer to FIGS. 1 to 6 for a preferable embodiment of the present invention. A cable adjusting device for vehicle (such as bicycle) includes a first sleeve 1 and a second sleeve 2.

The first sleeve 1 includes a first opening 11 and a second opening 12.

The second sleeve 2 is screwed to the second opening 12, an inner wall of the second sleeve 2 includes a first stop portion 21, the first stop portion 21 includes a first through hole 22, and the first through hole 22 is communicated with the first opening 11. The second sleeve 2 is configured to be sleeved around an outer tube 91 which is non-rotatably engaged with the inner wall of the second sleeve 2 and which is abutted against the first stop portion 21, and a wire 93 is disposed through the first through hole 22. By relative rotation between the first sleeve 1 and the second sleeve 2, the first stop portion 21 can displace the outer tube 91, which can adjust the tensional relationship between the outer tube 91 and the wire 93 and effectively improve operation of the wire 93. It has a simple structure since it requires just the first sleeve 1 and the second sleeve 2, thus being of low cost and easy assembling.

Specifically, the first stop portion 21 is integrally disposed at an end of the second sleeve 2 toward the first opening 11, and the first stop portion 21 is annular for being abutted against the outer tube 91. Preferably, the inner wall of the second sleeve 2 is configured to be non-rotatably engaged with the outer tube 91 so that it is required to rotate of the first sleeve 1 or the second sleeve 2 by one hand, for adjustment. In this embodiment, a plurality of ribs 23 is circumferentially separately disposed on the inner wall of the second sleeve 2 and extend axially, and the plurality of ribs 23 can be effectively engaged with the outer tube 91. It is noted that the plurality of ribs 23 extend from an end of the inner wall of the second sleeve 2, and each of the plurality of ribs 23 has a thickness between 0.1 mm to 0.8 mm (such as 0.4 mm) and a smooth top face which is configured to be effectively engaged with the outer tube 91.

In this embodiment, an inner wall of the first sleeve 1 includes a second stop portion 13 integrally formed thereof, the second stop portion 13 includes a second through hole 14, and the second stop portion 13 is located between the first opening 11 and the second opening 12.

Preferably, the first opening 11 has an inner diametric caliber larger than an inner diametric caliber of the second sleeve 2. The first opening 11 of the first sleeve 1 is configured to be sleeved around a cap 92, the cap 92 is configured to be abutted against the second stop portion 13, and the second stop portion 13 is annular. The cap 92 receives another outer tube 91. The first stop portion 21 and the second stop portion 13 can be respectively abutted against the outer tubes 91, and the cap 92 is rotatable relative to the first sleeve 1 so that the first sleeve 1 can be easily rotated for adjustment of the outer tube 91.

In this embodiment, an internal threaded portion 15 is disposed on the inner wall of the first sleeve 1 and between the second opening 12 and the second stop portion 13, and an external threaded portion 24 is disposed on an outer wall of the second sleeve 2 and screwed with the internal threaded portion 15. Preferably, a wall of the first sleeve 1 is polygonal for easy grip to rotate. Specifically, the first sleeve 1 has an inner diametric caliber between 4.5 mm to 5.5 mm, the second sleeve 2 has an inner diametric caliber between 3.5 mm to 4.5 mm, and the first through hole 22 has an inner diametric caliber between 1.0 mm to 2.5 mm. In this embodiment, the first sleeve 1 has an inner diametric caliber of 5 mm, the second sleeve 2 has an inner diametric caliber of 4 mm, the first through hole 22 has an inner diametric caliber of 1.5 mm, wherein the outer tube 91, the wire 93 and the cap 92 are generally of these above-mentioned dimensions, for example but not limited thereto.

Preferably, a distance from the second stop portion 13 to the first opening 11 is defined as a first length L1, a distance from the second stop portion 13 to the second opening 12 is defined as a second length L2, and a ratio of the second length L2 and the first length L1 is between 1.5 to 2.5, preferably 1.82. Since there is the internal threaded portion 15 disposed between the second opening 12 and the second stop portion 13 and since the second length L2 is larger than the first length L1, there is large adjustment range of the second sleeve 2 and the second sleeve 2 can be screwed to the first sleeve 1 stably. The inner wall of first sleeve further includes an inner annular surface 16 which is flat and non-threaded and is disposed between the first opening 11 and the second stop portion 13.

Preferably, the first sleeve 1 and the second sleeve 2 are made of thermoplastic material such as a composite of nylon and glass fiber, or ABS (Acrylonitrile Butadiene Styrene), thus having light weight, low cost and good structural strength. The first sleeve 1 and the second sleeve 2 which are made of thermoplastic material has lower friction coefficient, and thus there is low frictional resistance between the first sleeve 1 and the second sleeve 2 so that the first sleeve 1 and the second sleeve 2 are durable and can be relatively rotated easily.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A cable adjusting device for a vehicle, including:
    a first sleeve, including a first axially distal end face, a second axially distal end face, a first opening disposed at the first axially distal end face, and a second opening disposed at the second axially distal end face; and
    a second sleeve screwed to the second opening, the second sleeve including an inner wall, a first stop portion, a first axially distal end face, and a second axially distal end face, the first stop portion including a first axial face and a second axial face, the first axial face of the first stop portion is coincident with the first axially distal end face of the second sleeve and the second axial face of the first stop portion is disposed closer to the first axially distal end face of the second sleeve than the second axially distal end face of the second sleeve, the first stop portion extending radially inward from the inner wall of the second sleeve and configured to abut an outer tube of a Bowden cable, the first stop portion including a first through hole, the first through hole is communicated with the first opening,
    wherein an inner wall of the first sleeve includes a second stop portion integrally formed therewith, the second stop portion includes a second through hole, and the second stop portion is located between the first opening and the second opening,
    wherein an internal threaded portion is disposed on the inner wall of first sleeve and extends from the second opening to the second stop portion, an external threaded portion is disposed on an outer wall of the second sleeve and screwed with the internal threaded portion, and
    wherein the inner wall of the first sleeve further includes an inner annular surface which is non-threaded and extends from the first opening to the second stop portion;
    wherein the inner wall of the second sleeve includes a plurality of ribs configured to engage the outer tube of the Bowden cable in order to prevent relative rotation between the second sleeve and the outer tube of the Bowden cable, the plurality of ribs extending from the second axially distal end face of the second sleeve to the first stop portion.

2. The cable adjusting device for the vehicle of claim 1, wherein the first stop portion is annular.

3. The cable adjusting device for the vehicle of claim 1, wherein the plurality of ribs are circumferentially spaced apart from each other.

4. The cable adjusting device for the vehicle of claim 3, wherein each of the plurality of ribs has a thickness between 0.1 mm to 0.8 mm and a flat top face.

5. The cable adjusting device for the vehicle of claim 1, wherein the first opening of the first sleeve is configured to be disposed around a cap, the cap is configured to be abutted against the second stop portion, the second stop portion is annular, the cap is rotatable relative to the first sleeve, and a wall of the first sleeve is polygonal.

6. The cable adjusting device for the vehicle of claim 5, wherein a distance from the second stop portion to the first opening is defined as a first length, a distance from the second stop portion to the second opening is defined as a second length, and a ratio of the second length and the first length is between 1.5 to 2.5.

7. The cable adjusting device for the vehicle of claim 1, wherein the first sleeve and the second sleeve are made of thermoplastic material.

8. The cable adjusting device for the vehicle of claim 1, wherein the first sleeve has an inner diametric caliber between 4.5 mm to 5.5 mm, the second sleeve has an inner diametric caliber between 3.5 mm to 4.5 mm, and the first through hole has an inner diametric caliber between 1.0 mm to 2.5 mm.

* * * * *